United States Patent
Toyohara et al.

(10) Patent No.: US 10,458,546 B2
(45) Date of Patent: Oct. 29, 2019

(54) CONTINUOUSLY VARIABLE TRANSMISSION AND CONTROL METHOD OF CONTINUOUSLY VARIABLE TRANSMISSION

(71) Applicant: Nissan Motor Co., Ltd., Kanagawa (JP)

(72) Inventors: Kouhei Toyohara, Kanagawa (JP); Tomoyuki Nakano, Kanagawa (JP); Hiromu Terai, Kanagawa (JP); Ryohey Toyota, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/331,735

(22) PCT Filed: Aug. 7, 2017

(86) PCT No.: PCT/JP2017/028585
§ 371 (c)(1),
(2) Date: Mar. 8, 2019

(87) PCT Pub. No.: WO2018/047559
PCT Pub. Date: Mar. 15, 2018

(65) Prior Publication Data
US 2019/0203834 A1  Jul. 4, 2019

(30) Foreign Application Priority Data
Sep. 8, 2016 (JP) .................. 2016-175277

(51) Int. Cl.
*F16H 61/662* (2006.01)
*F16H 59/68* (2006.01)
(Continued)

(52) U.S. Cl.
CPC .............. *F16H 61/662* (2013.01); *F16H 9/18* (2013.01); *F16H 59/68* (2013.01);
(Continued)

(58) Field of Classification Search
CPC ......... F16H 61/66259; F16H 61/66272; F16H 61/12; Y10T 477/624; F02B 61/06
(Continued)

(56) References Cited

U.S. PATENT DOCUMENTS 4,584,907 A * 4/1986 Niwa .................... B04B 5/0421
                                                              477/46
5,944,626 A * 8/1999 Spiess ............... F16H 61/66259
                                                              474/28
(Continued)

FOREIGN PATENT DOCUMENTS

JP  2000-193074 A  7/2000
JP  2001-165293 A  6/2001
(Continued)

*Primary Examiner* — Henry Y Liu
(74) *Attorney, Agent, or Firm* — Osha Liang LLP

(57) ABSTRACT

A continuously variable transmission includes a variator having a primary pulley that has a primary oil chamber, a secondary pulley that has a secondary oil chamber, and a belt looped over the primary pulley and the secondary pulley, wherein secondary pressure is supplied to the secondary oil chamber, an oil pump provided in an oil passage that provides communication between the primary oil chamber and the secondary oil chamber, and a controller. The oil pump is configured to control an inflow and an outflow of oil of the primary oil chamber. The oil pump is formed by a gear pump. The continuously variable transmission controls the oil pump in such a manner that a target speed ratio of the variator is achieved.

7 Claims, 5 Drawing Sheets

(51) Int. Cl.
*F16H 61/02* (2006.01)
*F16H 61/06* (2006.01)
*F16H 9/18* (2006.01)
*F16H 61/00* (2006.01)
*F16H 61/30* (2006.01)

(52) U.S. Cl.
CPC ......... *F16H 61/0025* (2013.01); *F16H 61/02* (2013.01); *F16H 61/06* (2013.01); *F16H 61/30* (2013.01)

(58) Field of Classification Search
USPC ........................................................... 474/28
See application file for complete search history.

(56) References Cited

U.S. PATENT DOCUMENTS

| | | | |
|---|---|---|---|
| 6,219,608 B1 * | 4/2001 | Abo | F16H 61/66259 474/28 |
| 6,524,210 B1 * | 2/2003 | Vorndran | F16D 25/087 474/28 |
| 6,623,387 B1 * | 9/2003 | Luh | F16H 61/66272 474/28 |
| 8,051,650 B2 * | 11/2011 | Vetter | F16H 57/04 60/420 |
| 8,825,347 B2 * | 9/2014 | Yamada | F16H 61/0031 701/112 |
| 8,857,382 B2 * | 10/2014 | Yagasaki | F16H 61/0025 123/2 |
| 8,996,233 B2 * | 3/2015 | Waku | G06F 17/00 701/29.2 |
| 9,074,596 B2 * | 7/2015 | Miyamoto | F04B 49/20 |
| 9,739,374 B2 * | 8/2017 | Kanehara | F16H 61/0021 |
| 2008/0026904 A1 * | 1/2008 | Wagner | F16H 61/12 477/50 |

FOREIGN PATENT DOCUMENTS

| | | |
|---|---|---|
| JP | 2002-349666 A | 12/2002 |
| JP | 2007-327543 A | 12/2007 |

* cited by examiner

CONTINUOUSLY VARIABLE TRANSMISSION AND CONTROL METHOD OF CONTINUOUSLY VARIABLE TRANSMISSION

CROSS-REFERENCE TO RELATED APPLICATIONS

The present application is a national stage application of PCT/JP2017/028585, and claims priority to Japanese Patent Application No. 2016-175277 filed with the Japan Patent Office on Sep. 8, 2016, all the contents of which are hereby incorporated by reference in their entirety.

BACKGROUND

Technical Field

The present invention relates to a continuously variable transmission and a control method of a continuously variable transmission.

Related Art

JP2000-193074A discloses a technique of a belt continuously variable transmission. In the technique of JP2000-193074A, a belt is held by supplying secondary pressure to an oil chamber of a secondary pulley by a first electric oil pump for holding the belt. A second electric oil pump for shift is provided in an oil passage providing communication between oil chambers of a primary pulley and the secondary pulley, and shift is performed by bringing oil into and from the oil chamber of the primary pulley by the second electric oil pump.

SUMMARY OF INVENTION

In the technique as disclosed in JP2000-193074A, when a target speed ratio is achieved by shift, a speed ratio is sometimes maintained to be the target speed ratio in a state where a pressure difference is generated between the oil chambers of the primary pulley and the secondary pulley.

Meanwhile, in the technique of JP2000-193074A, a hydraulic pressure variation generated in the first electric oil pump acts on the second electric oil pump.

Therefore, under a situation where the above pressure difference is small, there is a possibility that the second electric oil pump may be influenced by the hydraulic pressure variation and repeat forward reverse rotation. As a result, since a backlash is provided between gear teeth of gears engaged with each other in a case where the second electric oil pump is formed by a gear pump, there is a possibility that continuous gear rattle occurs.

One or more embodiments of the present invention provides a continuously variable transmission and a control method of a continuously variable transmission with which occurrence of continuous gear rattle in an oil pump used for shift can be improved.

A continuously variable transmission according to one or more embodiments of the present invention includes a variator having a primary pulley that has a primary oil chamber, a secondary pulley that has a secondary oil chamber, and a belt looped over the primary pulley and the secondary pulley and an oil pump provided in an oil passage that provides communication between the primary oil chamber and the secondary oil chamber. In the variator, secondary pressure is supplied to the secondary oil chamber. The oil pump is adapted to control an inflow and an outflow of oil of the primary oil chamber. The oil pump is formed by a gear pump. The continuously variable transmission controls the oil pump in such a manner that a target speed ratio of the variator is achieved. The continuously variable transmission further includes a control unit adapted to perform correction control of controlling the oil pump in such a manner that generation of forward reverse rotation of the oil pump is suppressed in a case where a pressure difference between the primary oil chamber and the secondary oil chamber is within a preliminarily set unstable region.

According to one or more embodiments of the present invention, a control method of a continuously variable transmission is provided. The continuously variable transmission includes a variator having a primary pulley that has a primary oil chamber, a secondary pulley that has a secondary oil chamber, and a belt looped over the primary pulley and the secondary pulley and an oil pump provided in an oil passage that provides communication between the primary oil chamber and the secondary oil chamber. In the continuously variable transmission, secondary pressure is supplied to the secondary oil chamber and an inflow and an outflow of oil of the primary oil chamber are controlled by the oil pump. In a case where the oil pump is formed by a gear pump, the control method includes controlling of the oil pump in such a manner that a target speed ratio of the variator is achieved; and performing of correction control of controlling the oil pump in such a manner that generation of forward reverse rotation of the oil pump is suppressed in a case where a pressure difference between the primary oil chamber and the secondary oil chamber is within a preliminarily set unstable region.

DETAILED DESCRIPTION

Hereinafter, embodiments of the present invention will be described with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
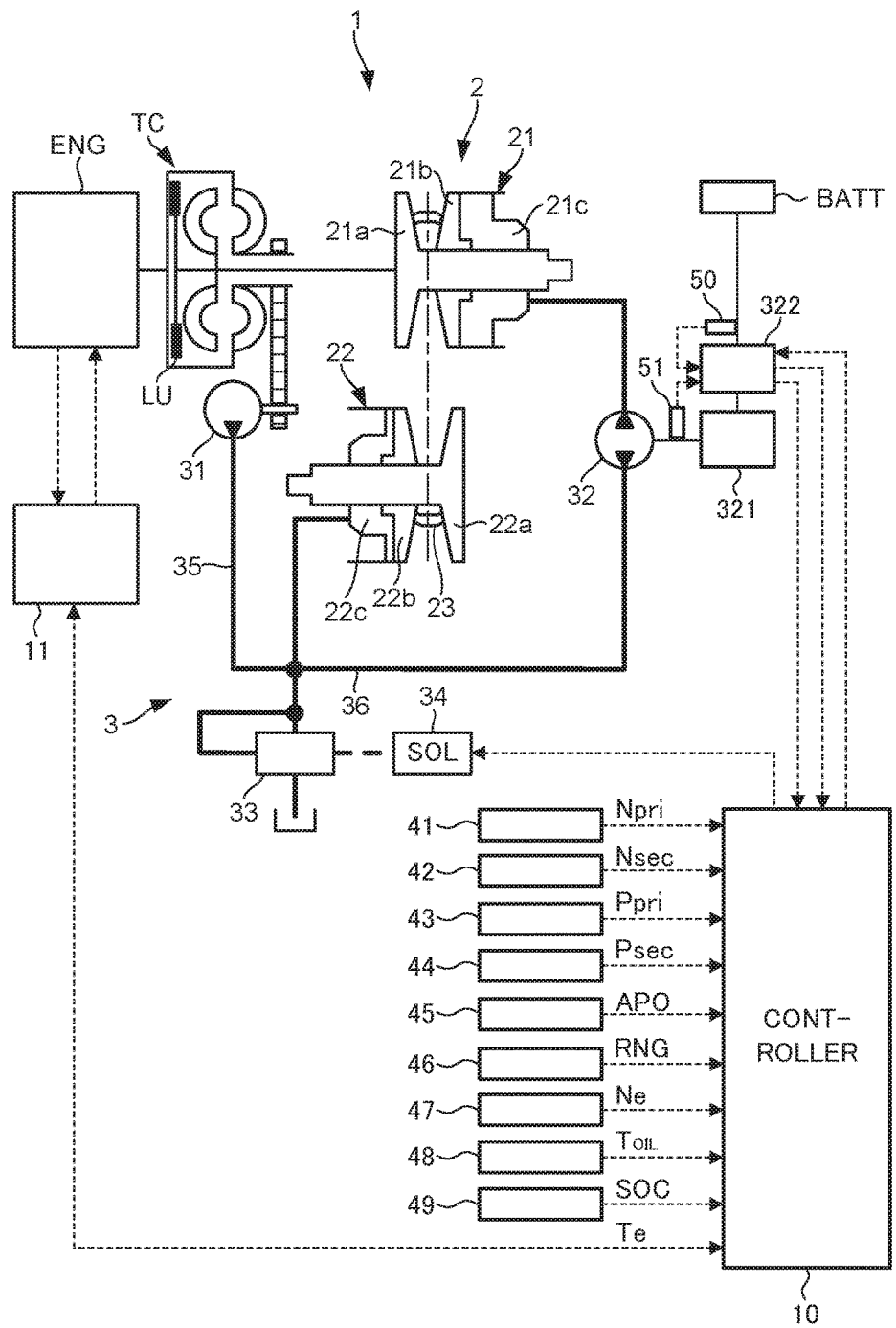
FIG. 1 is a schematic configuration diagram showing major portions of a transmission.

FIG. 1 is a schematic configuration diagram showing major portions of a transmission 1. The transmission 1 is a belt type continuously variable transmission mounted on a vehicle together with an engine ENG which forms a drive source of the vehicle. Rotation from the engine ENG is inputted to the transmission 1. The output rotation of the engine ENG is inputted to the transmission 1 via a torque converter TC having a lockup clutch LU, etc. The transmission 1 outputs the input rotation by rotation corresponding to a speed ratio.

The transmission 1 has a variator 2, a hydraulic circuit 3, and a controller 10.

The variator 2 is a belt type continuously variable transmission mechanism having a primary pulley 21, a secondary pulley 22, and a belt 23 looped over the primary pulley 21 and the secondary pulley 22. By respectively changing groove widths of the primary pulley 21 and the secondary pulley 22, the variator 2 changes a loop diameter of the belt 23 and performs shift. Hereinafter, the term "primary" will be called as "PRI", and the term "secondary" will be called as "SEC".

The PRI pulley 21 has a fixed pulley 21a, a movable pulley 21b, and a PRI oil chamber 21c. In the PRI pulley 21, oil is supplied to the PRI oil chamber 21c. When the movable pulley 21b is moved by the oil of the PRI oil chamber 21c, the groove width of the PRI pulley 21 is changed. Hereinafter, hydraulic pressure of the PRI oil chamber 21c will be called as PRI pressure Ppri.

The SEC pulley 22 has a fixed pulley 22a, a movable pulley 22b, and a SEC oil chamber 22c. In the SEC pulley 22, oil is supplied to the SEC oil chamber 22c. When the movable pulley 22b is moved by the oil of the SEC oil chamber 22c, the groove width of the SEC pulley 22 is changed. Hereinafter, hydraulic pressure of the SEC oil chamber 22c will be called as SEC pressure Psec.

The belt 23 is looped over a V-shaped sheave surface formed by the fixed pulley 21a and the movable pulley 21b of the PRI pulley 21, and a V-shaped sheave surface formed by the fixed pulley 22a and the movable pulley 22b of the SEC pulley 22. The belt 23 is held by belt nipping force generated by the SEC pressure Psec.

The hydraulic circuit 3 has a first oil pump 31, a second oil pump 32, a line pressure adjusting valve 33, a solenoid 34, a first oil passage 35, and a second oil passage 36.

The first oil pump 31 is formed by a mechanical oil pump to be driven by power of the engine ENG. The oil discharged by the first oil pump 31 is supplied to the first oil passage 35. The line pressure adjusting valve 33 is provided in the first oil passage 35.

The line pressure adjusting valve 33 adjusts pressure of the oil discharged by the first oil pump 31 to line pressure PL. The line pressure adjusting valve 33 is actuated in accordance with pilot pressure generated by the solenoid 34. The solenoid 34 generates the pilot pressure corresponding to a command value of the line pressure PL, and supplies to the line pressure adjusting valve 33.

The first oil passage 35 connects the first oil pump 31 and the second oil passage 36. The second oil passage 36 provides communication between the PRI oil chamber 21c and the SEC oil chamber 22c. The second oil pump 32 is provided in the second oil passage 36, and the first oil passage 35 is connected to a part of the second oil passage 36 on the side close to the SEC oil chamber 22c rather than the second oil pump 32. Therefore, the line pressure PL is supplied to the SEC oil chamber 22c as the SEC pressure Psec.

The second oil pump 32 is an electric oil pump which is rotatable in the forward and reverse directions. The second oil pump 32 is formed by a gear pump. A motor 321 and a driver 322 are provided in the second oil pump 32.

The motor 321 drives the second oil pump 32 in the forward and reverse directions. Specifically, a servomotor is used as the motor 321. Electric power is supplied to the motor 321 from a battery BATT via the driver 322. The driver 322 controls drive of the motor 321. Specifically, a servo-amplifier is used as the driver 322.

In the hydraulic circuit 3 formed in such a way, the first oil pump 31 supplies the SEC pressure Psec to the SEC oil chamber 22c, and the second oil pump 32 controls an inflow and an outflow of the oil of the PRI oil chamber 21c. The first oil pump 31 is used for holding the belt 23, and the second oil pump 32 is used for shift.

That is, as the principle of shift, shift is performed by moving the oil from one of the PRI oil chamber 21c and the SEC oil chamber 22c to the other by the second oil pump 32. However, between the PRI oil chamber 21c and the SEC oil chamber 22c, even in a state where pulley thrust force on the PRI pulley 21 side and pulley thrust force on the SEC pulley 22 side are balanced, a pressure difference $\Delta P$ is generated due to a difference in a piston pressure receiving area, etc.

The controller 10 is an electronic control device and forms a control unit in one or more embodiments. Signals from a rotation sensor 41 adapted to detect rotation speed on the input side of the variator 2, a rotation sensor 42 adapted to detect rotation speed on the output side of the variator 2, a pressure sensor 43 adapted to detect the PRI pressure Ppri, and a pressure sensor 44 adapted to detect the SEC pressure Psec are inputted to the controller 10. Specifically, the rotation sensor 41 detects rotation speed Npri of the PRI pulley 21. Specifically, the rotation sensor 42 detects rotation speed Nsec of the SEC pulley 22. The controller 10 can detect vehicle speed VSP on the basis of an input from the rotation sensor 42.

Further, signals from an accelerator pedal opening sensor 45, a selection range detection switch 46, an engine rotation sensor 47, and an oil temperature sensor 48 are inputted to the controller 10. The accelerator pedal opening sensor 45 detects an accelerator pedal opening APO which indicates an operation amount of an accelerator pedal. The accelerator pedal opening APO represents an acceleration demand by a driver. The selection range detection switch 46 detects a range RNG selected by a shift lever. The engine rotation sensor 47 detects rotation speed Ne of the engine ENG. The oil temperature sensor 48 detects an oil temperature $T_{OIL}$ of the transmission 1. The oil temperature $T_{OIL}$ is a temperature of the oil used as working oil in the variator 2.

In addition, signals from a current sensor 50 adapted to detect an electric current flowing between the motor 321 and the battery BATT and a rotation sensor 51 adapted to detect rotation speed of the motor 321, etc. are inputted to the controller 10. Both the signals from the current sensor 50 and the rotation sensor 51 are inputted to the controller 10 via the driver 322.

Further, the controller 10 is connected to an engine controller 11 adapted to control the engine ENG in such a manner that the controller 10 and the engine controller can communicate with each other. Engine torque information Te is further inputted to the controller 10 from the engine controller 11. On the basis of the inputted engine torque information Te, the controller 10 calculates input torque Tin of the variator 2. The input torque Tin can be calculated by, for example, multiplying engine torque obtained from the engine torque information Te by a gear ratio set between the engine ENG and the variator 2. The signal from the accelerator pedal opening sensor 45 and the signal from the engine rotation sensor 47 may be inputted to the controller 10 via, for example, the engine controller 11.

The controller 10 generates a shift control signal on the basis of the inputted signals, and outputs the generated shift control signal to the hydraulic circuit 3. In the hydraulic circuit 3, the line pressure adjusting valve 33 and the second oil pump 32 are controlled on the basis of the shift control signal from the controller 10. Thereby, a speed ratio Ratio of the variator 2 is controlled to be a speed ratio corresponding to the shift control signal, that is, a target speed ratio. The target speed ratio is preliminarily set in a shift map.

At the time of controlling the speed ratio Ratio, specifically, the controller 10 controls the second oil pump 32 in such a manner that the target speed ratio is achieved. The second oil pump 32 is controlled by controlling the motor 321, and the motor 321 is controlled by controlling the driver 322. The line pressure adjusting valve 33 is controlled by controlling the solenoid 34.

Figure 5:
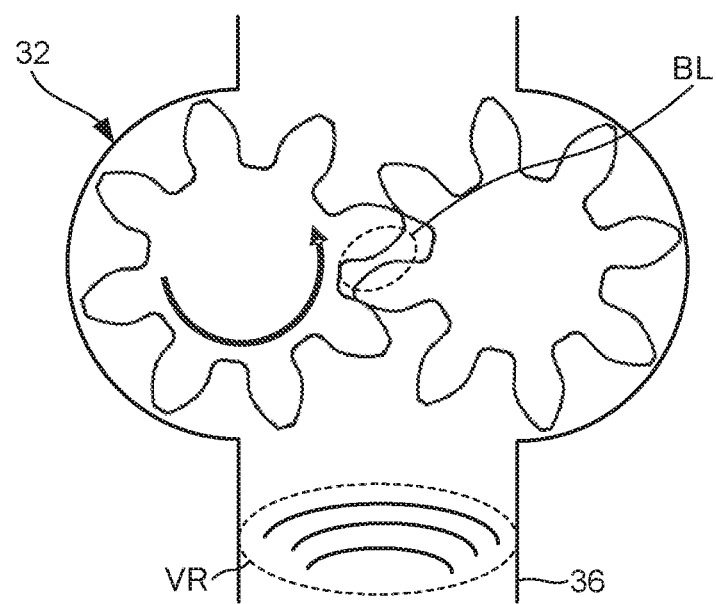
FIG. 5 is an illustrative view of a mechanism of occurrence of continuous gear rattle.

FIG. 5 is an illustrative view of a mechanism of occurrence of continuous gear rattle. As described above, the second oil pump 32 is formed by a gear pump, and a backlash BL is provided between gear teeth of gears engaged with each other. Therefore, in the transmission 1, the following matters are concerned.

In the transmission 1, when the target speed ratio is achieved by shift, the speed ratio Ratio is sometimes maintained to be the target speed ratio in a state where the pressure difference ΔP is generated between the PRI oil chamber 21c and the SEC oil chamber 22c.

Meanwhile, in the transmission 1, a hydraulic pressure variation VR generated in the first oil pump 31 acts on the second oil pump 32.

Therefore, under a situation where the pressure difference ΔP is small, the second oil pump 32 is influenced by the hydraulic pressure variation VR and repeats forward reverse rotation, and as a result, there is a concern that continuous gear rattle occurs in the second oil pump 32. This is specifically explained as follows.

In the transmission 1, pressure of the oil discharged by the first oil pump 31 is adjusted to the line pressure PL by the line pressure adjusting valve 33, and then supplied to the SEC oil chamber 22c via the second oil passage 36 as the SEC pressure Psec. Due to such a structure of the hydraulic circuit 3, the hydraulic pressure variation VR generated in the first oil pump 31 becomes a variation of the SEC pressure Psec and particularly acts on the second oil pump 32.

In a case where the speed ratio Ratio is largely changed, the second oil pump 32 is driven at high rotation such as several thousand rpm. Meanwhile, the second oil pump 32 is driven as follows in order to maintain the speed ratio Ratio constant in a case where the piston pressure receiving area is equal between the PRI pulley 21 and the SEC pulley 22.

That is, the second oil pump 32 is driven to supplement the oil leaked out from one of the SEC oil chamber 22c and the PRI oil chamber 21c to the other via the second oil pump 32. Upon supplementing the leaked oil, the second oil pump 32 is driven at extremely low rotation such as 100 rpm.

In a case where the speed ratio Ratio is maintained to be constant, a magnitude of drive torque of the second oil pump 32 is proportional to the pressure difference ΔP. Therefore, in a case where the second oil pump 32 is driven to supplement the leaked oil as described above, the pressure difference ΔP is small.

In a case where the pressure difference ΔP is small, the magnitude of the drive torque of the second oil pump 32 is also small. However, when the magnitude of the drive torque is small, the forward reverse rotation of the second oil pump 32 is generated due to the variation of the SEC pressure, and as a result, there is a concern that continuous gear rattle occurs in the second oil pump 32.

In consideration with such a situation, in one or more embodiments, the controller 10 performs control to be described next.

Figure 2:
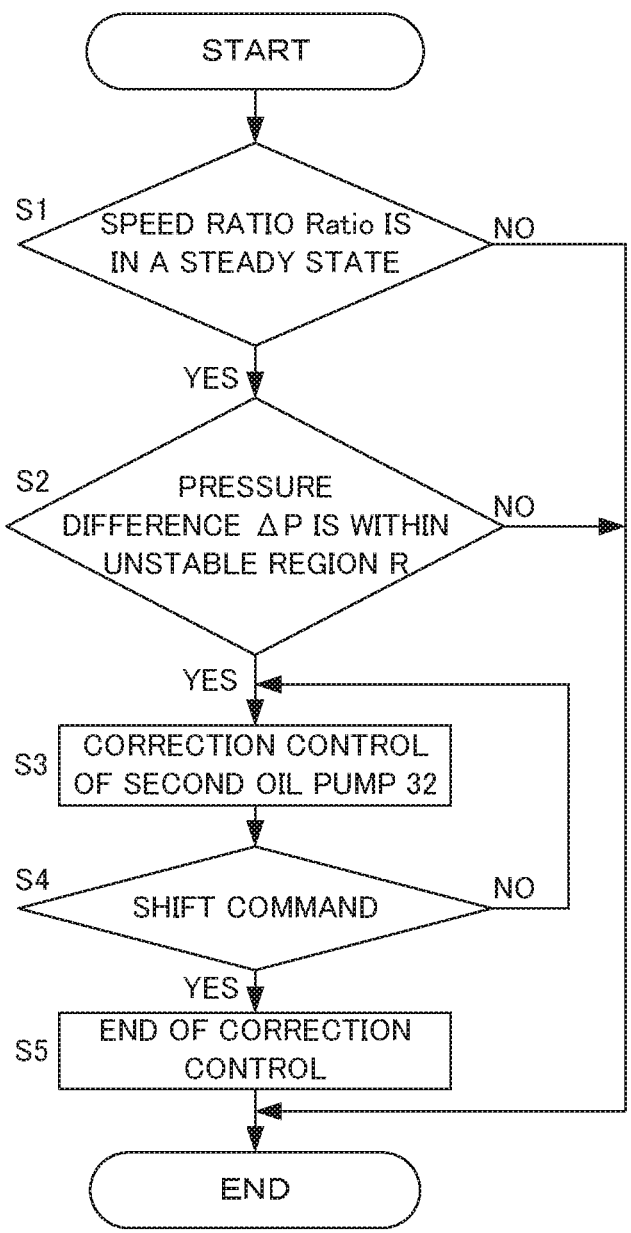
FIG. 2 is a flowchart showing an example of control to be performed by a controller.

FIG. 2 is a flowchart showing an example of the control to be performed by the controller 10.

In Step S1, the controller 10 determines whether or not the speed ratio Ratio is in a steady state. Whether or not the speed ratio Ratio is in a steady state can be determined on the basis of, for example, whether or not a change rate of the speed ratio Ratio, in other words, shift speed is not more than a predetermined change rate which is preliminarily set. The predetermined change rate is a value for regulating that the speed ratio Ratio is in a steady state, and can be preliminarily set. When it is determined to be No in Step S1, the processing is ended once. When it is determined to be Yes in Step S1, the processing is forwarded to Step S2.

In Step S2, the controller 10 determines whether or not the pressure difference ΔP between the SEC oil chamber 22c and the PRI oil chamber 21c is within an unstable region R. The unstable region R is a region where the forward reverse rotation of the second oil pump 32 is generated by the variation of the SEC pressure, the region being preliminarily set.

Specifically, the unstable region R is set as a region where a magnitude of the pressure difference ΔP is smaller than a predetermined pressure difference upon maintaining the speed ratio Ratio constant. The predetermined pressure difference is a value for regulating the pressure difference ΔP with which the forward reverse rotation of the second oil pump 32 is generated by the variation of the SEC pressure, and can be preliminarily set by an experiment, etc.

Therefore, the controller 10 can determine whether or not the pressure difference ΔP is within the unstable region R by, for example, determining whether or not the magnitude of the pressure difference ΔP is smaller than the predetermined pressure difference.

When it is determined to be No in Step S2, the processing is ended once. In a case where it is determined to be No in Step S2, the controller 10 can perform control of maintaining the speed ratio Ratio in a steady state. When it is determined to be Yes in Step S2, the processing is forwarded to Step S3.

In Step S3, the controller 10 performs correction control of the second oil pump 32. The correction control is control of controlling the second oil pump 32 in such a manner that generation of the forward reverse rotation of the second oil pump 32 is suppressed.

Figure 3:
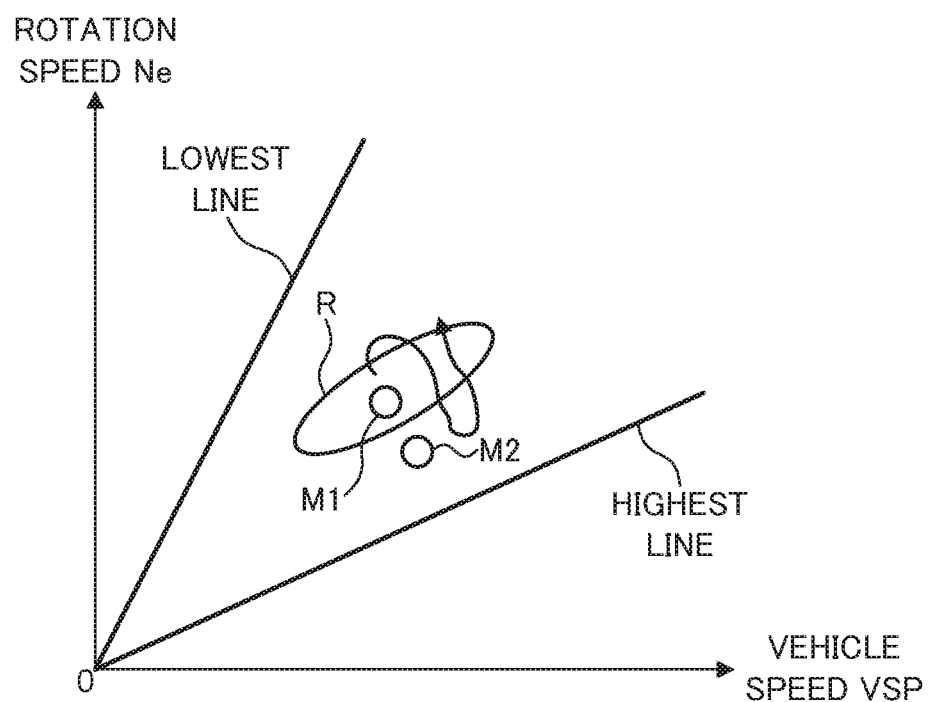
FIG. 3 is a graph schematically illustrating the control to be performed by the controller.

FIG. 3 is a graph schematically illustrating the control to be performed by the controller 10. In FIG. 3, the control to be performed by the controller 10 is schematically shown on a shift map of the variator 2 together with the unstable region R. Shift of the variator 2 is performed on the basis of the shift map. In the shift map, an operating point of the variator 2 is shown in accordance with the vehicle speed VSP and the rotation speed Ne. The rotation speed Npri may be used instead of the rotation speed Ne.

In the shift map, the speed ratio Ratio is shown by an inclination of a line connecting the operating point of the variator 2 and a zero point of the shift map. The shift of the variator 2 can be performed between the lowest line obtained by maximizing the speed ratio Ratio and the highest line obtained by minimizing the speed ratio Ratio.

Specifically, the correction control is control of maintaining the speed ratio Ratio to a value offset from the target speed ratio in such a manner that the pressure difference ΔP becomes out of the unstable region R. In this case, as shown in FIG. 3, the operating point of the variator 2 is moved from an operating point M1 within the unstable region R to an operating point M2 out of the unstable region R.

Returning to FIG. 2, in Step S4, the controller 10 determines whether or not a shift command is provided to the variator 2. Whether or not the shift command is provided to the variator 2 can be determined on the basis of, for example, whether or not the target speed ratio is changed.

When it is determined to be No in Step S4, the processing is returned to Step S3. Thereby, until the shift command is provided, the correction control is continued. When it is determined to be Yes in Step S4, the processing is forwarded to Step S5.

In Step S5, the controller 10 ends the correction control. That is, in a case where the speed ratio Ratio becomes out of a steady state, the correction control is ended. After Step S5, the processing is ended once.

In Step S3, as the correction control of the second oil pump 32, the controller 10 may perform control of increasing/decreasing the speed ratio Ratio with respect to the target speed ratio in such a manner that the pressure difference $\Delta P$ does not continuously remain within the unstable region R.

In this case, as schematically shown by an arrow in FIG. 3, with the unstable region R as center, the operating point of the variator 2 is moved upward in a case where the speed ratio Ratio is increased, that is, changed to the low side, and moved downward in a case where the speed ratio Ratio is decreased, that is, changed to the high side. As a result, the operating point does not continuously remain within the unstable region R.

Figure 4A:
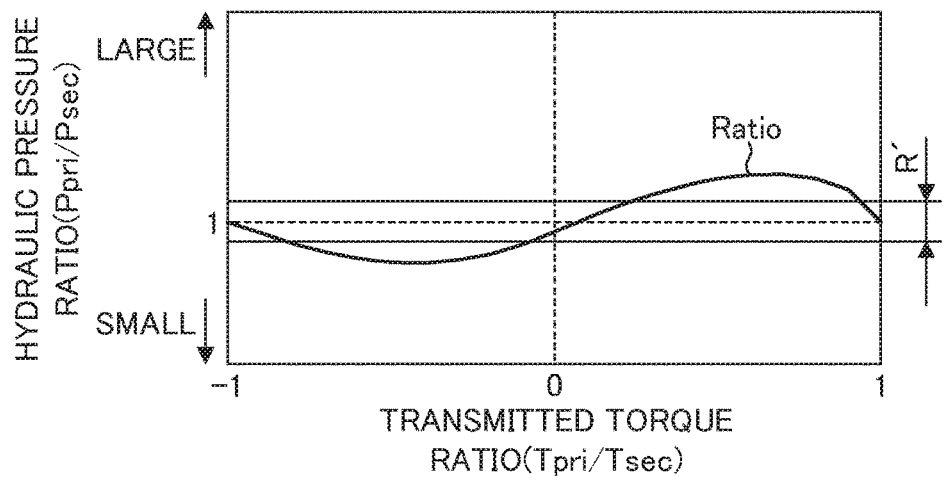
FIG. 4A is a first diagram of an illustrative view of an unstable region in accordance with a piston pressure receiving area.
Figure 4B:
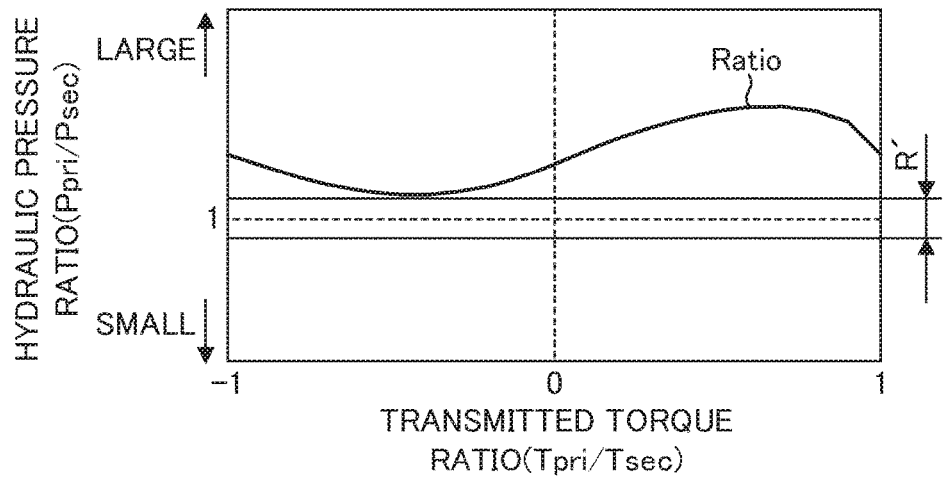
FIG. 4B is a second diagram of the illustrative view of the unstable region in accordance with the piston pressure receiving area.

FIGS. 4A and 4B are illustrative views of the unstable region R in accordance with the piston pressure receiving area. FIGS. 4A and 4B show the speed ratio Ratio in accordance with a hydraulic pressure ratio and a transmitted torque ratio. The figures show a case where the speed ratio Ratio is 1. The hydraulic pressure ratio is a value obtained by dividing the PRI pressure Ppri by the SEC pressure Psec. The transmitted torque ratio is a value obtained by dividing transmitted torque Tpri of the PRI pulley 21 by transmitted torque Tsec of the SEC pulley 22. An unstable region R' is obtained by converting the unstable region R in accordance with the pressure difference $\Delta P$ into a region in accordance with the hydraulic pressure ratio.

FIG. 4A shows a case where the piston pressure receiving area is equal between the PRI pulley 21 and the SEC pulley 22. In this case, with the hydraulic pressure ratio being 1, a magnitude of the transmitted torque ratio is 1, and the pulley thrust force is balanced between the PRI pulley 21 and the SEC pulley 22. In a case where the pulley thrust force is balanced, the speed ratio Ratio is in a steady state. In a case where the hydraulic pressure ratio is 1, the pressure difference $\Delta P$ is zero, and the hydraulic pressure ratio is included within the unstable region R'.

FIG. 4B shows a case where the piston pressure receiving area is larger in the SEC pulley 22 than in the PRI pulley 21. In this case, in a state where the speed ratio Ratio is 1, with the hydraulic pressure ratio being larger than 1, the magnitude of the transmitted torque ratio is 1, and the pulley thrust force is balanced between the PRI pulley 21 and the SEC pulley 22. Meanwhile, the unstable region R' is similar to the case of FIG. 4A. Therefore, in this case, even when the speed ratio Ratio is in a steady state, the hydraulic pressure ratio is not included within the unstable region R'.

However, in a state where the speed ratio Ratio is different from 1, the hydraulic pressure ratio is sometimes included within the unstable region R'. Therefore, even in a case where the piston pressure receiving area is different between the PRI pulley 21 and the SEC pulley 22, the processing of the flowchart shown in FIG. 2 may be similarly performed.

Next, operations and effects of one or more embodiments will be described.

The transmission 1 includes the variator 2 in which the SEC pressure is supplied to the SEC oil chamber 22c, and the second oil pump 32 provided in the second oil passage 36 that provides communication between the PRI oil chamber 21c and the SEC oil chamber 22c, the second oil pump 32 being adapted to control the inflow and the outflow of the oil of the PRI oil chamber 21c. The second oil pump 32 is formed by a gear pump. The transmission 1 controls the second oil pump 32 in such a manner that the target speed ratio of the variator 2 is achieved, while further including the controller 10 adapted to perform the correction control of controlling the second oil pump 32 in such a manner that the generation of the forward reverse rotation of the second oil pump 32 is suppressed in a case where the pressure difference $\Delta P$ is within the preliminarily set unstable region R.

With such a configuration, the correction control is performed on the second oil pump 32 in such a manner that the generation of the forward reverse rotation is suppressed in a case where the pressure difference $\Delta P$ is within the unstable region R. Thus, occurrence of continuous gear rattle in the second oil pump 32 can be improved.

In the transmission 1, the controller 10 performs, as the correction control, the control of maintaining the speed ratio Ratio to the value offset from the target speed ratio in such a manner that the pressure difference $\Delta P$ becomes out of the unstable region R.

With such a configuration, by bringing the pressure difference $\Delta P$ out of the unstable region R, the occurrence of continuous gear rattle in the second oil pump 32 can be improved.

In the transmission 1, the unstable region R is the region where the forward reverse rotation of the second oil pump 32 is generated by the variation of the SEC pressure.

With such a configuration, the occurrence of continuous gear rattle in the second oil pump 32 can be properly improved.

The controller 10 may perform, as the correction control of the second oil pump 32, the control of increasing/decreasing the speed ratio Ratio with respect to the target speed ratio in such a manner that the pressure difference $\Delta P$ does not continuously remain within the unstable region R.

In this case, the pressure difference $\Delta P$ also does not continuously remain within the unstable region R. Thus, the occurrence of continuous gear rattle in the second oil pump 32 can be improved.

Embodiments of the present invention are described above. However, the above embodiments do not limit the technical scope of the present invention to the specific configurations of the above embodiments, but only indicates part of application examples of the present invention.

In one or more of the above embodiments, the case where the first oil pump 31 is a mechanical oil pump is described. However, for example, an electric oil pump may be used as the first oil pump 31. In this case, the SEC pressure Psec can be controlled by the first oil pump 31. Thus, the line pressure adjusting valve 33 may be eliminated. In this case, the occurrence of continuous gear rattle because of that a hydraulic pressure variation VR generated in the first oil pump 31 becomes the variation of the SEC pressure Psec and acts on the second oil pump 32 can also be improved.

In one or more of the above embodiments, the case where the line pressure PL is supplied as the SEC pressure Psec is described. However, as the SEC pressure Psec, for example, hydraulic pressure generated and adjusted from the line pressure PL by a pressure adjusting valve may be supplied. In this case, the occurrence of continuous gear rattle because of that a hydraulic pressure variation VR generated in the first oil pump 31 becomes the variation of the SEC pressure Psec and acts on the second oil pump 32 can also be improved.

In one or more of the above embodiments, the case where the controller 10 forms the control unit is described. However, the control unit may be formed by, for example, plural controllers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A continuously variable transmission, comprising:
    a variator comprising:
        a primary pulley that has a primary oil chamber,
        a secondary pulley that has a secondary oil chamber, and
        a belt looped over the primary pulley and the secondary pulley,
        wherein secondary pressure is supplied to the secondary oil chamber;
    an oil pump provided in an oil passage that provides communication between the primary oil chamber and the secondary oil chamber; and
    a controller,
    wherein the oil pump is configured to control an inflow and an outflow of oil of the primary oil chamber,
    wherein the oil pump is formed by a gear pump,
    wherein the continuously variable transmission controls the oil pump in such a manner that a target speed ratio of the variator is achieved,
    wherein the controller is configured to perform correction control of controlling the oil pump in such a manner that generation of forward reverse rotation of the oil pump is suppressed in a case where a pressure difference between the primary oil chamber and the secondary oil chamber is within a preliminarily set unstable region,
    wherein the unstable region is a region where a magnitude of the pressure difference between the primary oil chamber and the secondary oil chamber is smaller than a predetermined pressure difference, and
    wherein the predetermined pressure difference is a value for regulating a pressure difference with which the forward reverse rotation of the oil pump is generated by a variation of the secondary pressure.

2. The continuously variable transmission according to claim 1,
    wherein the controller performs, as the correction control, control of maintaining a speed ratio of the variator to a value offset from the target speed ratio in such a manner that the pressure difference between the primary oil chamber and the secondary oil chamber becomes out of the unstable region.

3. The continuously variable transmission according to claim 1,
    wherein the controller performs, as the correction control, control of increasing/decreasing a speed ratio of the variator with respect to the target speed ratio in such a manner that the pressure difference between the primary oil chamber and the secondary oil chamber does not continuously remain within the unstable region.

4. The continuously variable transmission according to claim 1,
    wherein the unstable region is a region where the forward reverse rotation of the oil pump is generated by a variation of the secondary pressure.

5. A control method of a continuously variable transmission comprising:
    a variator comprising:
        a primary pulley that has a primary oil chamber,
        a secondary pulley that has a secondary oil chamber, and
        a belt looped over the primary pulley and the secondary pulley; and
    an oil pump provided in an oil passage that provides communication between the primary oil chamber and the secondary oil chamber,
    the control method comprising:
        controlling, via the oil pump, the continuously variable transmission in which secondary pressure is supplied to the secondary oil chamber and an inflow and an outflow of oil of the primary oil chamber, wherein the oil pump is formed by a gear pump,
        controlling the oil pump in such a manner that a target speed ratio of the variator is achieved; and
        performing correction control of controlling the oil pump in such a manner that generation of forward reverse rotation of the oil pump is suppressed in a case where a pressure difference between the primary oil chamber and the secondary oil chamber is within a preliminarily set unstable region,
        wherein the unstable region is a region where a magnitude of the pressure difference is smaller than a predetermined pressure difference, and
        wherein the predetermined pressure difference is a value for regulating a pressure difference with which the forward reverse rotation of the oil pump is generated by a variation of the secondary pressure.

6. The continuously variable transmission according to claim 2,
    wherein the unstable region is a region where the forward reverse rotation of the oil pump is generated by a variation of the secondary pressure.

7. The continuously variable transmission according to claim 3,
    wherein the unstable region is a region where the forward reverse rotation of the oil pump is generated by a variation of the secondary pressure.

* * * * *